United States Patent
Murata

(10) Patent No.: US 7,502,136 B2
(45) Date of Patent: Mar. 10, 2009

(54) DIGITAL COPIER WITH IMAGE SCANNER APPARATUS AND OFFLINE IMAGE DATA AND CONTROL DATA INTERFACE

(75) Inventor: Kazuyuki Murata, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/298,334

(22) Filed: Dec. 9, 2005

(65) Prior Publication Data

US 2006/0109507 A1    May 25, 2006

Related U.S. Application Data

(62) Division of application No. 10/278,340, filed on Oct. 22, 2002, now Pat. No. 7,054,028, which is a division of application No. 09/624,955, filed on Jul. 25, 2000, now abandoned, which is a division of application No. 08/719,796, filed on Sep. 25, 1996, now Pat. No. 6,111,659.

(30) Foreign Application Priority Data

Sep. 26, 1995   (JP)   .................... 7-247638
Jan. 17, 1996   (JP)   .................... 8-005284

(51) Int. Cl.
*G06F 15/00* (2006.01)
*G06K 1/00* (2006.01)

(52) U.S. Cl. ............ 358/1.16; 358/1.15; 358/401; 358/404

(58) Field of Classification Search ......... 358/448, 358/401, 1.13, 1.14, 1.15, 1.16, 479, 442, 358/404; 399/83, 185; 717/170; 386/130
See application file for complete search history.

(56) References Cited

U.S. PATENT DOCUMENTS 4,719,516 A    1/1988    Nagashima
4,725,977 A    2/1988    Izumi et al.
4,806,978 A *  2/1989    Nakatani et al. ............ 399/185
4,980,719 A    12/1990   Allen et al.
5,016,114 A    5/1991    Sakata et al.

(Continued)

FOREIGN PATENT DOCUMENTS

JP    62-86445 A    4/1987

(Continued)

OTHER PUBLICATIONS

Japanese Office Action, dated Jul. 10, 2007.

*Primary Examiner*—Edward L Coles
*Assistant Examiner*—Satwant K Singh
(74) *Attorney, Agent, or Firm*—Hamre, Schumann, Mueller & Larson, P.C.

(57) ABSTRACT

A digital copying machine comprising an image scanner part for reading an original image to reproduce image data of the original image, a laser printer part for printing an image according to given image data, a removable memory card, and a reader/writer of the memory card is provided. For offline print, the image data of a document prepared in an external computer and output control data are stored into the memory card. By installing this memory card in the digital copying machine, the digital copying machine prints the image data read out from the memory card offline in a desired output form. For offline image input, read control data obtained by using an image scanner such as a read gradation level, a read size, density, and the degree of edge enhancement is stored in the removable memory card using software executed in an external computer. By installing this storage medium in the digital copying machine and setting an original to be read in the digital copying machine, the original image is read according to the read control data stored in the memory card, and the obtained image data is stored into the memory card.

6 Claims, 21 Drawing Sheets

U.S. PATENT DOCUMENTS

| | | | |
|---|---|---|---|
| 5,019,916 A | 5/1991 | Ogura | |
| 5,027,288 A | 6/1991 | Suzuki et al. | |
| 5,041,873 A | 8/1991 | Kawabuchi et al. | |
| 5,043,762 A | 8/1991 | Iwaki et al. | |
| 5,072,310 A * | 12/1991 | Yamamoto et al. | 358/448 |
| 5,105,284 A * | 4/1992 | Sakata et al. | 358/404 |
| 5,115,273 A | 5/1992 | Ujiie et al. | |
| 5,150,456 A | 9/1992 | Wu et al. | |
| 5,195,176 A | 3/1993 | Lung | |
| 5,201,031 A | 4/1993 | Kasaki | |
| 5,221,953 A | 6/1993 | Higaki | |
| 5,222,200 A | 6/1993 | Callister et al. | |
| 5,241,659 A | 8/1993 | Parulski et al. | |
| 5,349,448 A | 9/1994 | Hiyai | |
| 5,410,641 A | 4/1995 | Wakabayashi et al. | |
| 5,477,264 A | 12/1995 | Sarbadhikari et al. | |
| 5,499,113 A * | 3/1996 | Tsuboi et al. | 358/479 |
| 5,506,692 A | 4/1996 | Murata | |
| 5,519,499 A | 5/1996 | Saito | |
| 5,535,017 A | 7/1996 | Hideaki | |
| 5,537,517 A | 7/1996 | Wakabayashi et al. | |
| 5,574,533 A | 11/1996 | Itoh | |
| 5,606,428 A | 2/1997 | Hanselman | |
| 5,666,211 A | 9/1997 | Tahara et al. | |
| 5,706,103 A | 1/1998 | Matoba et al. | |
| 5,710,843 A | 1/1998 | Tsukamoto et al. | |
| 5,724,490 A | 3/1998 | Shibaki et al. | |
| 5,752,040 A * | 5/1998 | Kaneko et al. | 717/170 |
| 5,764,368 A | 6/1998 | Shibaki et al. | |
| 5,771,103 A | 6/1998 | Ogino | |
| 5,805,300 A | 9/1998 | Fukishima | |
| 5,896,403 A | 4/1999 | Nagasaki et al. | |
| 5,900,947 A * | 5/1999 | Kenmochi et al. | 358/442 |
| 5,923,437 A * | 7/1999 | Itoh | 358/401 |
| 6,111,659 A | 8/2000 | Murata | |
| 6,151,445 A * | 11/2000 | Nishimura | 386/130 |
| 6,292,202 B1 | 9/2001 | Nishio | |
| 6,330,067 B1 | 12/2001 | Murata | |
| 6,332,149 B1 | 12/2001 | Warmus et al. | |
| 2002/0093682 A1 | 7/2002 | Nakajima | |

FOREIGN PATENT DOCUMENTS

| | | |
|---|---|---|
| JP | 62-226375 | 10/1987 |
| JP | 1-196077 | 8/1989 |
| JP | 2-28823 | 1/1990 |
| JP | 2-310568 | 12/1990 |
| JP | 3-114767 | 5/1991 |
| JP | 3-290867 | 12/1991 |
| JP | 4-10761 | 1/1992 |
| JP | 4-37564 | 2/1992 |
| JP | 4-52161 | 2/1992 |
| JP | 4-205270 | 7/1992 |
| JP | 5-108512 A | 4/1993 |
| JP | 5-122496 | 5/1993 |
| JP | 5-150915 | 6/1993 |
| JP | 6-8537 | 1/1994 |
| JP | 6-274294 | 9/1994 |
| JP | 7-58935 A | 3/1995 |
| JP | 7-93511 | 4/1995 |
| JP | 7-95388 A | 4/1995 |
| JP | 7-121415 A | 5/1995 |
| JP | 9-93376 A | 4/1997 |
| JP | 2002-211082 A | 7/2002 |

* cited by examiner

| | |
|---|---|
| PaperSize | A4, A4R, B4, A3, B5, B5R |
| Resolution | 400, 600 |
| GrayLevel | 1, 2, 4, 8 |
| FileFormat | TIFF, JPEG, PCL5 |
|    TIFFCompression | G3, G4, RLE, LZW |
| BothSidePrint | No, Yes |
| CenterBinding | No, Yes |
| Sort | No, Stack, Sort |
|    MaxSort | 20 |
|    MaxStack | 100 |
| Staple | No, Yes |
|    StaplePosition | 1, 2, 3, 4 |
|    MaxStapleSheets | 50 |
| Punch | No, Yes |
| MaxPunchSeet | 50 |

FIG. 3

| Printing Function Dialong Box | |
|---|---|
| START Page-END Page | 1　　　　　　　　　　999 |
| Copies | 13 |
| Paper Size | ●A4　OA4R　OB4　OA3　OB5　OB5R |
| Resolution [DPI] | O400　●600 |
| Gray Level [BIT/PIXEL] | ●1　O2　O4　O8 |
| File Format | ●TIFF　OJPEG　OPCL5 |
| 　　TIFF Compression | OG3　●G4　ORLE　OLZW |
| Both Side Printing | ONo　●Yes |
| Center Binding | ●No　OYes |
| Sorting Condition | ONo　OStack　●Sort |
| Staple | ONo　●Yes |
| 　　Staple Position | ●1　O2　O3　O4 |
| Punch | ●No　OYes |
| Data File Name | sample |
| | OK　　　　Cancel |

FIG. 5

```
Reset

Copies            13

PaperSize         A4

Resolution        600

GrayLevel         1

FileFormat        TIFF

TIFFCompression G4

BothSidePrint     Yes

CenterBinding     No

Sort              Sort

Staple            Yes

StaplePosition 1

Punch             No

DataFile          sample.tif
```

FIG. 6

| | |
|---|---|
| PaperSize | Auto, A4, A4R, B4, A3, B5, B5R |
| PaperFeed | Auto, ADF, FlatBed |
| MAXResolution | 400 |
| MINResolution | 25 |
| GrayLevel | 1,2,4,8 |
| Halftone | BI, DT, ED |
| FileFormat | TIFF, BMP, JPEG |
| TIFFCompression | G3, G4, RLE, LZW |
| BothSideScan | No, Yes |
| Contrast | Auto, −2, −1, 0, 1, 2 |
| Density | Auto, −2, −1, 0, 1, 2 |
| EdgeEnhance | Auto, −2, −1, 0, 1, 2 |
| ScanArea | No, Yes |
| ScanAreaUnit | mm |

FIG. 9

| | |
|---|---|
| Scanning Function Dialong Box | |
| Paper Size | ●Auto ○A4 ○A4R ○B4 ○A3 ○B5 ○B5R |
| Paper Feed | ●Auto ○ADF ○FlatBed |
| Scanning Resolution [DPI] | 100  [25-400] |
| Gray Level [BIT/PIXEL] | ●1 ○2 ○4 ○8 |
| Halftone Processing | ●Binarzing ○Dithering ○Error Diffusion |
| File Format | ●TIFF ○BMP ○JPEG |
| TIFF Compression | ○G3 ●G4 ○RLE ○LZW |
| Both Side Scanning | ○No ●Yes |
| Contrast | ●Auto ○-2 ○-1 ○0 ○1 ○2 |
| Density | ●Auto ○-2 ○-1 ○0 ○1 ○2 |
| Edge Enhancement | ●Auto ○-2 ○-1 ○0 ○1 ○2 |
| Scanning Area Setting | ○No ●Yes |
| Scanning Area Upper-Left Position [mm] | X= 10  Y= 20 |
| Scanning Area Length Upper-Left [mm] | X= 60  Y= 70 |
| Data File Name | sample |
| | OK  Cancel |

FIG. 10

```
Reset

PaperSize          Auto

PaperFeed          Auto

Resolution         100

GrayLevel          1

Halftone           B1

FileFormat         TIFF

TIFFCompression G4

BothSideScan       Yes

Contrast           Auto

Density            Auto

EdgeEnhance        Auto

ScanArea           Yes

ScanAreaPosition   10, 20

ScanAreaLength     60, 70

DataFile           sample.tif
```

FIG. 11

```
PaperSize        Auto, A4, A4R, B4, A3, B5, B5R

PaperFeed        Auto, ADF, FlatBed

MAXResolution    1200

MINResolution    25

GrayLevel        1, 4, 8 if GrayLevel==1 then Halftone BI, DT, ED if GrayLevel==4 then Quantizing SIMPLE, DT, ED FileFormat       TIFF, BMP, JPEG if File Format== TIFF && Gray Level==1 then Compression G3, G4, RLE, NO if File Format== TIFF && Gray Level==4 then Compression LZW, NO if File Format== TIFF && Gray Level==8 then Compression LZW, JPEG, NO if File Format==JPEG||Compression==JPEG then Compression Rate Normal, High, Low Contrast         Auto, -2, -1, 0, 1, 2

Density          Auto, -2, -1, 0, 1, 2

EdgeEnhance      Auto, -2, -1, 0, 1, 2

ScanArea         No, Yes

ScanAreaUnit    mm
```

FIG. 17

| | |
|---|---|
| Scanning Function Dialong Box | |
| Paper Size | ●Auto ○A4 ○A4R ○B4 ○A3 ○B5 ○B5R |
| Paper Feed | ●Auto ○ADF ○FlatBed |
| Scanning Resolution [DPI] | 100  [25-1200] |
| Gray Level [BIT/PIXEL] | ●1 ○4 ○8 |
| Halftone Processing | ●Binarzing ○Dithering ○Error Diffusion |
| File Format | ●TIFF ○BMP ○JPEG |
| Compression | ○G3 ●G4 ○RLE ○JPEG ○NO |
| Compression Rate | ○High ●Normal ○Low |
| Contrast | ●Auto ○-2 ○-1 ○0 ○1 ○2 |
| Density | ●Auto ○-2 ○-1 ○0 ○1 ○2 |
| Edge Enhancement | ●Auto ○-2 ○-1 ○0 ○1 ○2 |
| Scanning Area Setting | ○No ●Yes |
| Scanning Area Upper-Left Position [mm] | X=10  Y=20 |
| Scanning Area Length Upper-Left [mm] | X=60  Y=70 |
| Data File Name | sample |
| | OK   Cancel |

FIG. 18

```
Reset

PaperSize        Auto

PaperFeed        Auto

Resolution       100

GrayLevel        1

Halftone         81

FileFormat       TIFF

Compression G4

Contrast         Auto

Density          Auto

EdgeEnhace       Auto

ScanArea         Yes

ScanAreaPosition 10, 20

ScanAreaLength     60, 70

DataFile         sample.tif
```

FIG. 19

006
DIGITAL COPIER WITH IMAGE SCANNER APPARATUS AND OFFLINE IMAGE DATA AND CONTROL DATA INTERFACE

This application is a divisional of application Ser. No. 10/278,340, filed Oct. 22, 2002; which is a divisional of Ser. No. 09/624,955, filed Jul. 25, 2000; which is a divisional of Ser. No. 08/719,796, filed on Sep. 25, 1996, which application is incorporated herein by reference.

BACKGROUND OF THE INVENTION

The present invention relates to a digital copying machine and an image reader provided with the functions of offline image input and output using a removable storage medium.

Recently, the demand for high speed and multi-functional digital copying machines has arisen, and a digital copying machine provided with a facsimile function, a printer function, etc. in addition to a copy function has been developed. A conventional digital copying machine will be described below, referring to the figures. FIG. 13 is a block diagram which shows a flow chart for an image signal of a conventional digital copying machine.

As shown in FIG. 13, an image sensor 71 scans an original to convert reflected light from the original to an electric signal. An analog image signal from image sensor 71 is then converted to a digital image signal by an analog-to-digital (A/D) converter 72. The converted digital image signal is subjected to image processing such as edge enhancement, trimming, and halftone processing, and edit processing in am image processor 73. An image signal given by image processor 73 is buffered in a buffer memory 74 for speed control to be given to a laser driver 78. Laser driver 78 drives a semiconductor laser 79 to form an electronic latent image by laser beams given by semiconductor laser 79.

The digital copying machine further comprises a central processing unit (CPU) 85, a local area network (LAN) controller 80, a page memory 84, a parallel interface (I/F) 81, a communication control unit (CCU) 82, and a compressor/expander 86 which are mutually connected by a CPU bus 83.

CPU 85 comprises a random access memory (RAM) and a read only memory (ROM) and controls the entire digital copying machine. Page memory 84 has capacity that can store at least one page of image data and is connected to buffer memory 74. Image data stored in page memory 84 is given to laser driver 78 through buffer memory 74 to be printed on paper.

LAN controller 80 communicates with an external equipment through a local area network (LAN). When the digital copying machine is used as a remote printer, an external equipment such as a computer transmits a print control command and image data to the digital copying machine through the LAN. CPU 85 stores the image data received through the LAN into the page memory according to the received print control command.

Using parallel I/F 81, the digital copying machine and an external equipment can be connected one to one. When the digital copying machine is used as a printer for the external equipment, the external equipment transmits a print control command and image data to the digital copying machine through the parallel I/F of the digital copying machine. When the image scanner function of the digital copying machine is used by the external equipment, the external equipment transmits an image read control command to the digital copying machine through parallel I/F 81, and read image data is transmitted to the external equipment from the digital copying machine.

CCU 82 communicates with an external facsimile through a public network using a modem 87. Image data received by the facsimile is expanded in compressor/expander 86, transferred to page memory 84, and printed. Also, image data read for facsimile transmission is stored in page memory 84, compressed in compressor/expander 86, and transmitted to the external facsimile through CCU 82 and modem 87.

Generally, a high-speed digital plain paper copier (PPC) which is capable of copying more than tens of sheets per minute is located in a common space such as a copy room or a hallway. When copying a document which is prepared by a personal computer, etc. in plural copies, a user has to print the original by a nearby printer, take the original to a place where a digital copying machine is located, and then copy the original in plural copies using a sorter, etc. of the digital copying machine. Especially, when a personal computer used by a user is not connected through a LAN, the remote print function of the digital copying machine can not be used, so that copying must be done as mentioned above. In this case, an original image is once printed on paper before copying it, and therefore the image is inevitably degraded.

When a personal computer used by a user is connected to the digital copying machine through a LAN, the user can use the remote print function of the digital copying machine. Therefore, the user can directly utilize a function such as a sorter of the digital copying machine from his personal computer. However, when copying by using the remote print function of the digital copying machine, the user has to go to a distant place where the digital copying machine is located to take printed paper. Also, when copying in large amount using the remote print function, problems such as using up paper and paper jam are likely to occur. To solve these troubles, the user also has to go to the place where the digital copying machine is located. Thus, the utility value of the remote (online) print function in a high-speed digital copying machine is not very high.

When using the image scanner function of the digital copying machine from a user's personal computer online by using the parallel I/F and the LAN, similar problems arise. That is, the user has to go to a distant place where the digital copying machine is located to set an original in the image scanner part of the digital copying machine. Therefore, when the digital copying machine and the user's computer are located a distance apart, it is not useful to use the image scanner function of the digital copying machine online.

Next, a conventional image reader will be described. FIG. 21 is a block diagram showing a flow chart for an image signal of a conventional image reader. An image sensor 171 scans an original to convert reflected light from the original to an electric signal. An analog image signal given by image sensor 171 is converted to a digital image signal by an A/D converter 172, and given to an image processor 173. Image processor 173 performs image processing such as edge enhancement, trimming, halftone processing, pixel density conversion, and gradation level conversion as well as edit processing on the digital image signal. Image data given by image processor 173 is stored in a buffer memory 174.

For controlling the entire image reader, a CPU 185 comprising a RAM and a ROM is provided. CPU 185, image processor 173, buffer memory 174, a DMA (direct memory access) controller 180, and a small computer system interface (SCSI) controller 181 are mutually connected through a CPU bus 183.

DMA controller 180 transfers image data stored in buffer memory 174 to SCSI controller 181 directly. An external equipment such as a computer transmits a control command for the image reader to the image reader through the SCSI controller and receives image data from the image reader. CPU 185 sets the degree of edge enhancement, the gradation level of image data, read density, etc. according to the image read control command.

Such an image reader is connected to an external equipment such as a personal computer one to one using an interface such as a SCSI. Therefore, the image reader is used exclusively by the user of the connected personal computer. When another user uses the image reader, the user has to use the personal computer connected to the image reader or connect the image reader to his personal computer.

SUMMARY OF THE INVENTION

The present invention provides a digital copying machine and an image reader provided with an interface for offline image input and output using a removable storage medium.

According to a first aspect of a digital copying machine of the present invention, the digital copying machine comprises means for reading an original image to reproduce the image data of the original image (e.g. an image scanner), means for printing an image according to given image data (e.g. a laser printer), means for accessing a removable storage medium (e.g. a reader/writer of a memory card), and means for controlling the printing means according to output control data stored in the storage medium so that the printing means can print an image according to image data stored in the storage medium.

Preferably, the digital copying machine further comprises a sorter for sorting printed paper, a finisher for stapling printed paper, and means for controlling the sorter or the finisher according to output control data stored in the storage medium.

Preferably, the digital copying machine further comprises means for storing information of the functions of the printing means and the finisher into the storage medium so that the information can be used by an external equipment such as a computer for generating the output control data.

Preferably, in order to store as much information as possible into the storage medium having limited storage capacity, the image data is compressed by encoding, and the digital copying machine further comprises means for expanding the compressed image data. Preferably, the digital copying machine further comprises means for erasing output control data and image data stored in the storage medium after printing the image data.

According to the digital copying machine of the present invention as mentioned above, by storing the image data of a document, etc. prepared by an external equipment such as a personal computer and output control data into the removable storage medium, and installing the storage medium in the digital copying machine of the present invention, the digital copying machine prints image data read out from the storage medium offline in a desired output form. As a result, a user can directly copy a document in copies of a predetermined number using the digital copying machine of the present invention, without the need for copying an original which is previously printed by a nearby printer. In this case, the image quality of a copy is advantageously not degraded.

Also, by controlling the sorter or finisher of the digital copying machine according to output control data stored in the storage medium, a user can specify the number of copies, a sorting or stapling method, etc. when a document, etc. is prepared by an external computer.

Furthermore, by previously storing (downloading) information of functions provided in the the digital copying machine, for example, the printing means and the sorter or finisher, a user can effectively use all the functions of the digital copying machine.

According to a second aspect of a digital copying machine of the present invention, the digital copying machine comprises means for reading an original image to reproduce the image data of the original image, means for printing an image according to given image data, means for accessing a removable storage medium, and means for controlling the image reading means according to read control data stored in the storage medium so that the image reading means can read an original image so as to produce the image data of the original image to be stored in the storage medium.

In the above aspect, preferably, in order to generate the read control data using an external equipment such as a computer, the digital copying machine further comprises means for storing information of the function of the image reading means into the storage medium. Preferably, the digital copying machine further comprises means for compressing image data given by the image reading means.

According to the digital copying machine of the present invention as mentioned above, offline image input using an image scanner function is readily implemented. That is, read control data obtained by using the image scanner, for example, a read gradation level, a read size, an image compressing method, the degree of edge enhancement, contrast, read density, and an image data file name are stored in a removable storage medium using software executed in an external computer. Then, the storage medium is installed in the digital copying machine, an original to be read is set in the digital copying machine, an original image is read according to the read control data stored in the storage medium, and image data is stored in the storage medium. A user removes the storage medium from the digital copying machine and installs it in a personal computer, for example, and desired image data can be read out from the storage medium to the personal computer.

According to a first aspect of an image reader of the present invention, the image reader comprises an image sensor for converting optical information from an original image to an electric signal, an A/D converter for converting the electric signal given by the image sensor to a digital image signal, an image processor for processing the digital image signal to produce image data, means for accessing a removable storage medium, and means for controlling the image processor according to read control data stored in the storage medium so that the image processor can produce the image data to be stored in the storage medium.

According to a second aspect of an image reader of the present invention, the image reader comprises an image sensor for converting optical information from an original image to an electric signal, an A/D converter for converting the electric signal given by the image sensor to a digital image signal, an image processor for processing the digital image signal to produce image data, an interface for transmitting the image data to an external equipment, means for accessing a removable storage medium, and means for selecting either transmitting the image data to the external equipment by the interface or storing the image data into the storage medium by the accessing means.

According to the image reader of the present invention as mentioned above, a user stores read control data, for example, a read gradation level, a read size, an image compressing method, the degree of edge enhancement, contrast, read density, and an image data file name into a removable storage medium using software executed in an external computer. Then, the storage medium is installed in the image reader of the present invention, and an original to be read is set in the image reader. The image reader of the present invention reads an original image according to the read control data stored in the storage medium, and read image data is stored into the storage medium. Thus, an offline image input function is implemented. A user removes the storage medium from the image reader of the present invention and installs it in a personal computer, etc., and desired image data can be read out from the storage medium to the personal computer, etc.

By providing the image reader with the offline image input function as mentioned above, in addition to a conventional one-to-one interface with an external equipment, the image reader can be connected one to one to a personal computer of a user who uses the image reader most frequently, and other users can use the image reader using the offline image input function without changing the connection.

Also, the image reader of the present invention can output read image data offline in a different read form for each user into the storage medium. Furthermore, a user can readily generate read control data using the user interface of a personal computer, for example. Even if a computer is not connected to the image reader as in the case of a portable note-type computer, an original image can be readily read offline using a memory card, etc.

Furthermore, the image reader of the present invention can download information of the image read function of the image reader to the storage medium, so that a user can readily utilize all the functions of the image reader.

BRIEF DESCRIPTION OF THE DRAWINGS

FIG. 3 shows an example of the content of a print function information file;

FIG. 5 illustrates a dialog box for setting a print function by a user;

FIG. 6 illustrates the content of a print job command file;

FIG. 9 illustrates the content of a read function information file;

FIG. 10 illustrates a dialog box for setting a read function;

FIG. 11 illustrates the content of a scan job command file;

FIG. 17 illustrates the content of a read function information file;

FIG. 18 illustrates a dialog box for setting a read function;

FIG. 19 illustrates the content of a scan job command file;

DESCRIPTION OF THE PREFERRED EMBODIMENTS

Figure 1:
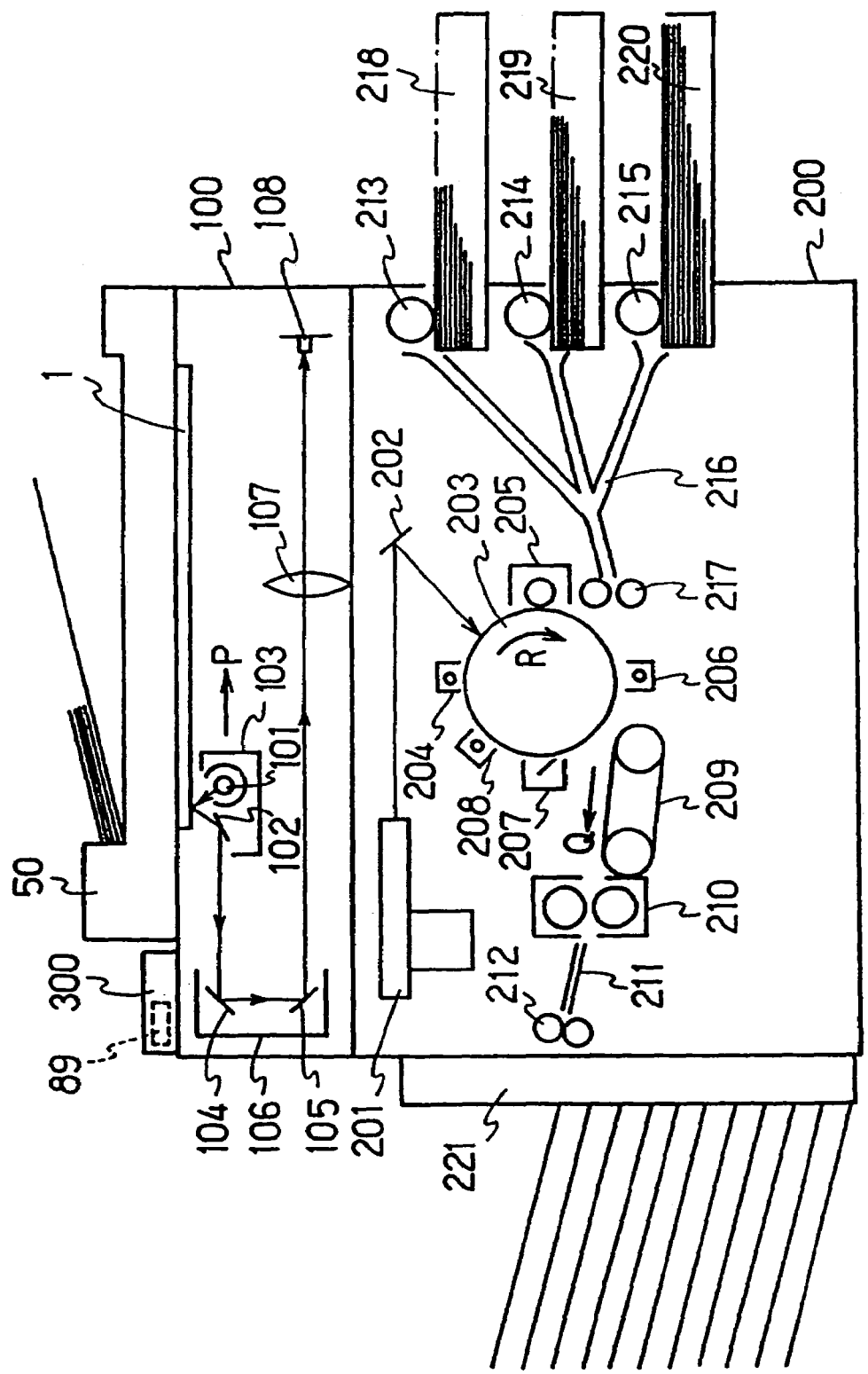
FIG. 1 is a cross-sectional view of a digital copying machine according to an embodiment of the present invention.

A digital copying machine according to an embodiment of the present invention will be described in detail below. FIG. 1 is a cross-sectional view schematically showing the internal structure of a digital copying machine of this embodiment. This digital copying machine comprises an auto document feeder (ADF) 50 provided on a glass sheet 1, an image scanner section 100 provided beneath glass sheet 1, a laser printer section 200 provided independently beneath image scanner section 100, and an operation section 300 provided at the side of glass sheet 1. Operation section 300 is provided with a PC card slot 89.

Image scanner section 100 comprises an exposure lamp 101, a first mirror 102, a constant-speed unit 103, a second mirror 104, a third mirror 105, a half-speed unit 106, a lens 107, and an image sensor 108.

Laser printer section 200 comprises a laser scanner unit 201, a mirror 202, a photoconductor drum 203, a main charging device 204, a developing device 205, a transfer charging device 206, a cleaner 207, a discharging lamp 208, a carrier belt 209, a fixing device 210, a guide 211, a paper discharge roller 212, paper feed rollers 213, 214 and 215, a guide 216, a timing roller 217, paper cassettes 218, 219 and 220, and a sorter 221. Laser scanner unit 201 comprises a semiconductor laser, a polygonal motor, a polygonal mirror, and a laser optic system.

The basic operation of this digital copying machine will be described below. A plurality of originals put on ADF 50 are set downward on transparent glass sheet 1 one by one. When exposure lamp 101 exposes an original, reflected light from the original is reflected to second mirror 104 by first mirror 102. Constant-speed unit 103 comprising exposure lamp 101 and first mirror 102 moves in the direction of an arrow P at a constant speed to scan the original. Half-speed unit 106 comprising second mirror 104 and third mirror 105 further reflects the reflected light from first mirror 102 and moves in the same direction as that of constant-speed unit 103 at half the speed of constant-speed unit 103. The reflected light from the original through half-speed unit 106 is focused by lens 107 to be focused on image sensor 108.

Photoconductor drum 203 rotates in the direction of arrow R at a constant speed. Main charging device 204 charges photoconductor drum 203 uniformly. Laser beams from laser scanner unit 201 are reflected by mirror 202 to form an electrostatic latent image on photoconductor drum 203. Developing device 205 develops the electrostatic latent image using a toner to form a toner image on photoconductor drum 203.

Cassettes 218, 219 and 220 are removable, and plural types of paper having different combinations of paper sizes and directions are held in respective cassettes. Paper feed rollers 213, 214 and 215 feed sheets of paper in the cassettes one by one. Guide 216 guides the fed paper to timing roller 217. Timing roller 217 controls paper feed timing to register the fed paper to the toner image on photoconductor drum 203. The toner image on photoconductor drum 203 is transferred to the paper by the electric field generated by transfer charging device 206. Carrier belt 209 moves in the direction of an arrow Q to carry the paper to fixing device 210. Fixing device 210 fixes the toner on the paper by heat.

The paper from fixing device 210 is guided to sorter 221 through guide 211 and paper discharge roller 212. Sorter 221 comprises a plurality of paper discharge trays (bins) and performs sorting in copying for each copy. Also, sorter 221 comprises a staple function and a punch function. Cleaner 207 removes any residual toner on photoconductor drum 203. Discharging lamp 208 exposes photoconductor drum 203 to eliminate the electric charge on photoconductor drum 203.

Figure 2:
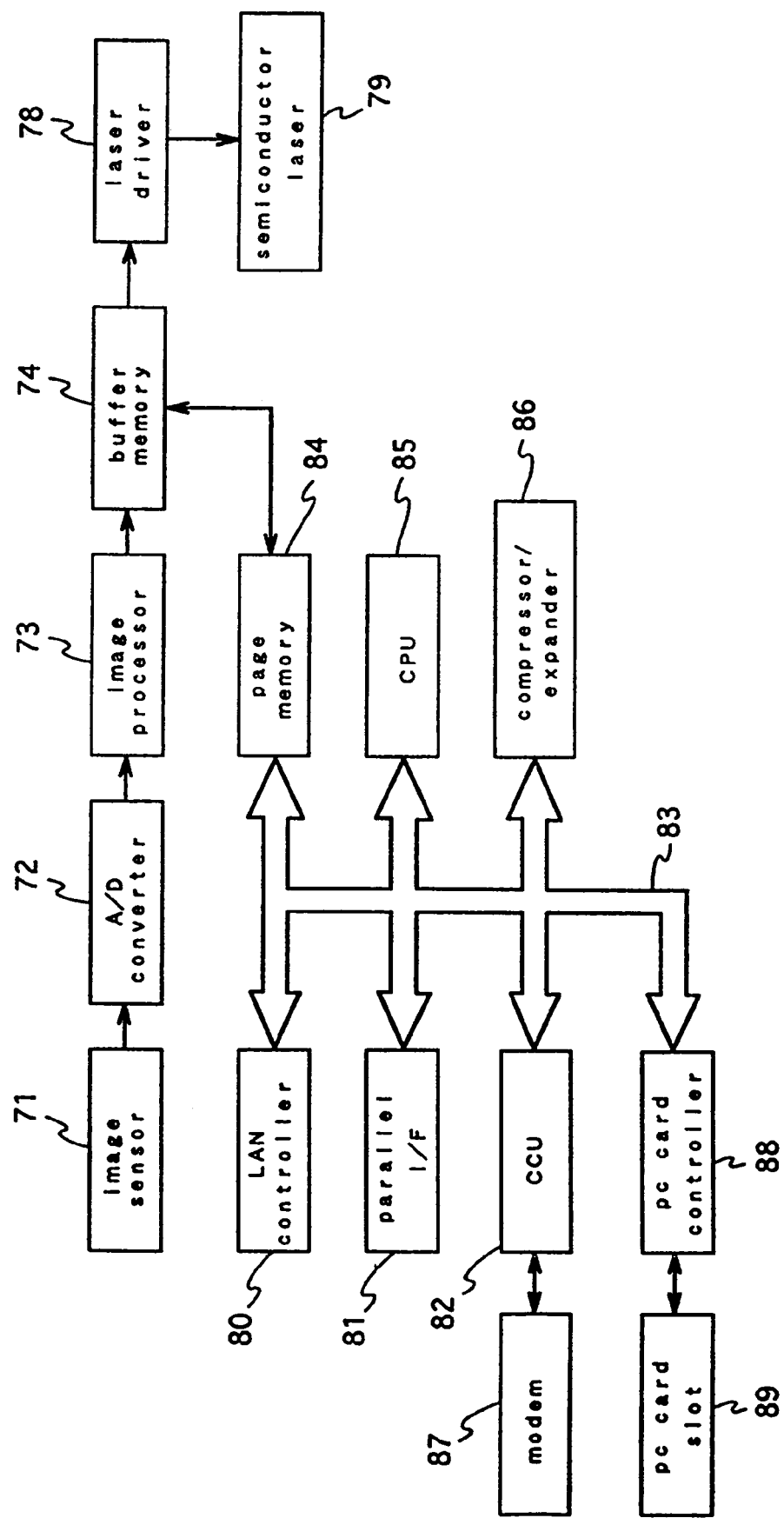
FIG. 2 is a block diagram showing a flow chart for a signal in the digital copying machine in FIG. 1.

Next, the flow of a signal in the digital copying machine of this embodiment will be described by referring to FIG. 2. Reflected light from an original obtained by scanning the original is converted to an electric signal by an image sensor 71, and then converted to a digital image signal by an A/D converter 72. This digital image signal is subjected to image processing such as edge enhancement, trimming, and half-tone processing, and edit processing in an image processor 73. An image signal from image processor 73 is stored in a buffer memory 74 for controlling a speed to be given to a laser driver 78. Laser driver 78 drives a semiconductor laser 79, and an electrostatic latent image is formed on the drum by laser beams from semiconductor laser 79.

Buffer memory 74 is connected to a page memory 84. Page memory 84, a CPU 85, a LAN controller 80, a parallel I/F 81, a communication control unit (CCU) 82, a compressor/expander 86, and a PC card controller 88 are mutually connected by a CPU bus 83.

CPU 85 comprises a RAM and a ROM and controls the entire digital copying machine. Page memory 84 has capacity that can store at least one page of image data. Image data stored in page memory 84 is given to laser driver 78 through buffer memory 74 to be printed on paper.

LAN controller 80 communicates with an external equipment through a local area network (LAN). When the digital copying machine is used as a facsimile transmission server, an external equipment such as a computer transmits the telephone number of a transmit destination and image data to the digital copying machine through the LAN. CPU 85 controls compressor/expander 86 to compress the image data received from the external equipment through the LAN as required.

CCU 82 transmits the image data compressed in compressor/expander 86 to an external facsimile through a public network using a modem 87.

Also, using parallel I/F 81, the digital copying machine and an external equipment can be connected one to one. In this case, the digital copying machine can be controlled from a nearby computer. By executing dedicated software for controlling a digital copying machine on a computer connected to the digital copying machine, a copy mode such as the numbers of pages and copies, a paper size, copy density, a magnification rate, both side copy, and a sorting method can be set. Also, complicated edit setting such as the setting of frame erasure or a trimming area, or the setting of the reversal and its area can be done using the display and the mouse of the computer.

Image data received by facsimile is expanded in compressor/expander 86, transferred to page memory 84, and printed. Image data read for facsimile transmission is stored in page memory 84, compressed in compressor/expander 86, and transmitted to an external facsimile through CCU 82 and modem 87.

PC card controller 88 controls an access from CPU 85 to the memory card installed in a PC card slot 89. If a print job command file storing print control data and an image data file to be printed exist in the memory card installed in PC card slot 89, this digital copying machine prints image data according to the print control data.

In the digital copying machine, installation of optional equipment such as a sorter and a finisher and an edit function to be set differ according to individual option structures. By storing information of a printer function into the memory card as a print function information file, usable functions can be readily utilized offline. The detail of this offline print function will be described later.

Also, if a scan job command file storing read control data exists in the memory card installed in PC card slot 89, this digital copying machine reads the image of a set original according to the read control data and generates an image data file to be stored into the memory card. Reading of an original is started when a user pushes a start button of operation section 300 after setting the original. In the digital copying machine, installation of an optional equipment such as an ADF and an image read function differs according to individual option structures. By storing information of the image read function of an image scanner into the memory card as an image read function information file, usable functions are easily utilized offline. The detail of this offline image input function will be described later.

Offline Print Function

An offline print function in the digital copying machine of this embodiment will be described. A user previously installs his memory card in the digital copying machine and downloads a print function information file to the memory card. An example of the content of a print function information file is shown in FIG. 3.

The content of the print function information file is shown in the following format for each row:

Function item, a list of selectable functions; or
Function item, function capability.

The first setting value in each list of selectable functions is a default value. The content of the print function information file shown in FIG. 3 will be described below.

A first row: A paper size can be selected from A4, A4R, B4, A3, B5, and B5R, and the default is A4.

A second row: Resolution is selected from either 400 DPI (dots per inch) or 600 DPI, and the default is 400 DPI.

A third row: A gray level (the number of data bits per pixel) is selected from 1, 2, 4, and 8, and the default value is 1 bit.

A fourth row: An image data file format is selected from TIFF (tagged image file format), JPEG (joint photographic experts group), and PCL5 (printer control language 5), and the default is TIFF.

A fifth row: When TIFF is selected as the image data file format, a data compressing method is selected from G3 (MH), G4 (MMR), RLE (run length), and LZW (Lenpel-Ziv-Walsh), and the default is G3.

A sixth row: A both side print function can be used. Whether using the function or not can be set, and a one side print in which the both side print function is not used is set as a default.

A seventh row: A center binding function can be used. When the center binding function is used, page order is rearranged to print two pages on one side of paper having twice the area size of an image. The center binding function is not used as a default.

An eighth row: A sorter can be used. Nonuse of the sorter, stacking for each page, or sorting for each copy can be specified. The default is nonuse of the sorter.

A ninth row: The number of the paper discharge trays of the sorter is 20. Therefore, more than 20 copies can not be sorted.

A tenth row: When the sorter function is used, the maximum number of paper sheets that can be stacked in each tray is 100.

An eleventh row: A stapler can be used, and it is not used as a default.

Figure 4:
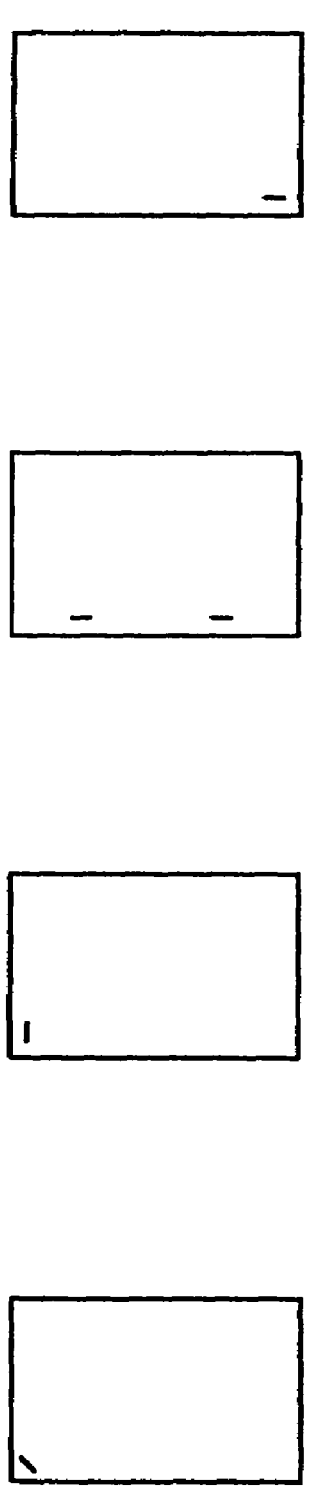
FIG. 4 illustrates the relationship between staple positions and position numbers.

A twelfth row: When the stapler is used, a staple position can be selected from positions 1-4. The default is position 1. The relationship between positions 1-4 and the actual staple positions is shown in FIG. 4.

A thirteenth row: When the stapler is used, the maximum number of paper sheets that can be stapled is as shown.

A fourteenth row: A puncher can be used, and it is not used as a default.

A fifteenth row: When the puncher is used, the maximum number of paper sheets that can be punched is as shown.

A user produces a document or an image using application software for producing document/image such as word processor or desk top publishing (DTP) software executed on a personal computer. Printer driver software for the digital copying machine of this embodiment is previously installed in the user's personal computer. When the document or the image produced by the user is printed offline using the digital copying machine of the present invention, a memory card to which a print function information file is downloaded is installed in the user's personal computer. The user starts the printer driver from the application software for producing document/image. The printer driver refers to the print function information file stored in the memory card to display a dialog box for setting the print function of the digital copying machine on the personal computer display.

An example of a dialog box corresponding to the print function information file in FIG. 3 is shown in FIG. 5. In FIG. 5, box areas on the right side of "START Page-END Page", "Copies", and "Data File Name" are edit boxes. A print start page, an end page, the number of copies, and an image data file name are entered in respective edit boxes. Marks ○ are radio buttons that are alternatively selected. Marks ● indicate selected functions. When TIFF is selected as the image data file format, "TIFF Compression" is valid. When "Sort" is set for "Sorting Condition", the printer driver checks the "Max Sort" and "Max Stack" values of the print function information file, and if the values are inconsistent with the setting of the numbers of copies and pages, the printer driver warns the user. Similarly, when the staple function or the punch function is used, the printer driver checks the "Max Staple Sheets" and "Max Punch Sheet" values of the print function information file, and if the values are inconsistent with the setting of the numbers of copies and pages, the printer driver warns the user.

The user clicks an OK button by the mouse after setting each function of the dialog box. The printer driver generates a print job command file and an image data file according to the setting in the dialog box and stores the files into the memory card. The content of the print job command file corresponding to the setting of the dialog box in FIG. 5 is shown in FIG. 6. "Reset" of the print job command file in FIG. 6 indicates to reset the set values of the print function to default values. For "Data File", an image file name to be printed is written. In FIG. 5, the image file name is "sample.tif". One image file has images of plural pages (multi-page image). Also, one print job command file may have a plurality of jobs. Therefore, it is possible to print out a plurality of image files with different print function settings.

Figure 7:
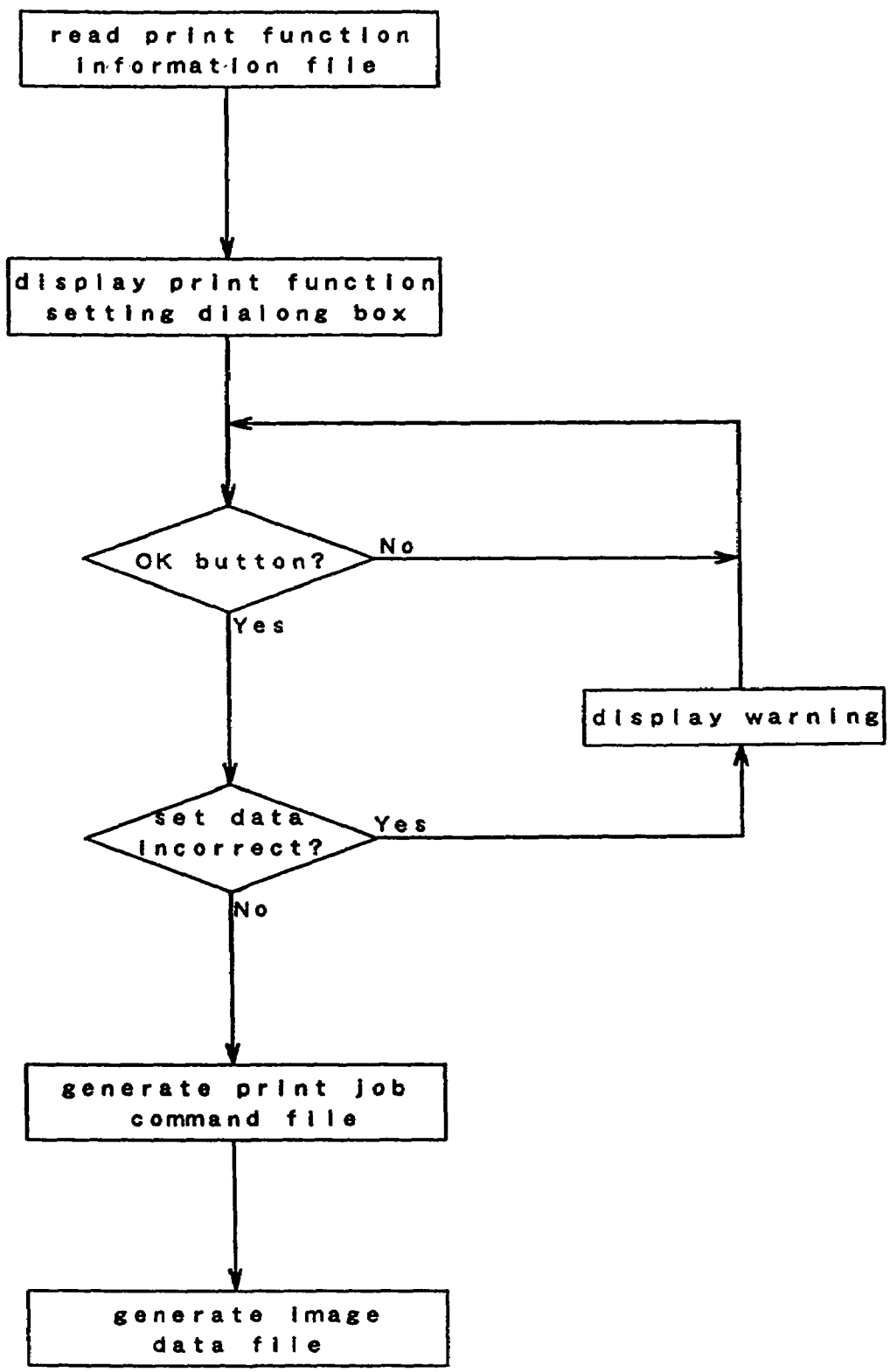
FIG. 7 is a flow chart for a process executed by a printer driver.

The flow chart of the printer driver is shown in FIG. 7. The printer driver reads the print function information file from the memory card and displays the dialog box for setting a print function according to the file. The user clicks the OK button after setting each function of the dialog box. The printer driver checks whether the setting of the dialog box is incorrect or not, and if the setting is incorrect, the printer driver displays a warning to urge the user to correct an incorrect part. If the setting is correct, a print job command file and an image data file are generated to be stored in the memory card.

The user pulls out the memory card storing the print job command file and the image data file from the user's personal computer and inserts the memory card into PC card slot 89. CPU 85 detects through PC card controller 88 that the memory card is inserted and searches if the print job command file exists in the memory card. If the print job command file exists, CPU 85 analyzes the print job command file and performs setting required for the control circuits of the laser printer part and the sorter part.

CPU 85 refers to the image data file name in the print job command file to read the image data file from the memory card for printing. If the image data is compressed, CPU 85 stores the image data into page memory 84 using compressor/expander 86. When printing with center binding, the page order of the image data file is not the same as the order for printing, and therefore CPU 85 controls the printing of each page in the image data file in suitable order. When all printing as specified in the print job command file is completed, CPU 85 erases the print job command file and the image data file stored in the memory card.

By storing the image data of a document and output control data (print job command file) into the removable storage medium using a user's personal computer, and installing this storage medium in PC card slot 89 of the digital copying machine, the image data stored in the storage medium can be printed offline in a desired output form. Therefore, the user can specify the number of copies, a sorting method, and a stapling method, when the document is prepared by the personal computer. It is not necessary to print an original by a nearby printer once and copy the printed original as conventionally, and the image quality does not deteriorate. Even if the external equipment is not connected to a LAN as in the case of a portable note-type computer, offline print can be readily performed using the memory card and the digital copying machine of the present invention.

Figure 8:
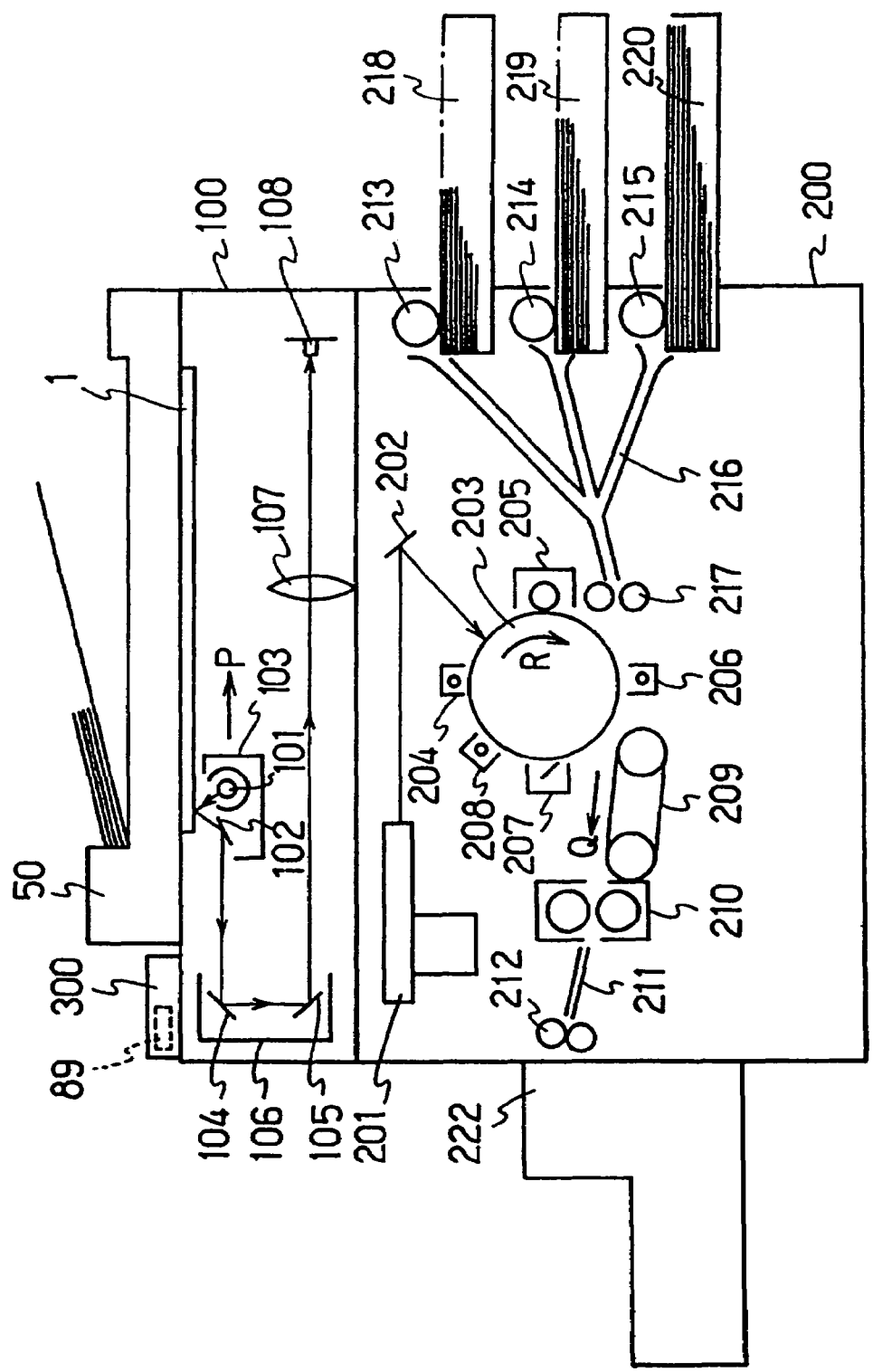
FIG. 8 is a cross-sectional view of a digital copying machine provided with a finisher according to another embodiment.

Also, for a fast-speed copying machine, the structure of optional equipment such as a sorter and a finisher varies, so that it is difficult for a user to fully use the functions of each copying machine when a plurality of the copying machines are used. A digital copying machine shown in FIG. 8 is similar to the embodiment in FIG. 1 except that a finisher 222 is installed instead of sorter 221. The finisher stacks printed paper for each copy and staples the paper. Particularly in a digital copying machine, an electronic finisher for sorting for each copy is used instead of a mechanical sorter. The electronic finisher comprises mass storage means such as a hard disk device in the digital copying machine, stores the image data of read original of plural pages once, prints images of plural pages for each copy, and outputs the sorted printed paper sheets for each copy.

When finisher 222 is installed in the digital copying machine instead of mechanical sorter 221, a hard disk device is also added to the digital copying machine. Some finishers have the function of folding printed paper. Also, in some cases, optional equipment called an automatic both side unit must be installed in the digital copying machine for both side print. Thus, the print functions of digital copying machines of the same type differ according to installation of optional equipment in the copying machine. In the digital copying machine of the present invention, the print function information of the copying machine can be downloaded to the storage medium, so that a user can readily set all the print functions using the dialog box for setting a print function displayed on the personal computer even if he does not fully know the print functions of individual digital copying machines.

Offline Image Input Function

An offline image input function in an digital copying machine of an embodiment of the present invention will be described. A user previously installs his memory card in the digital copying machine and downloads a read function information file to the memory card. An example of the content of a read function information file is shown in FIG. 9.

The content of the read function information file is shown in the following format for each row:

Function item, a list of selectable functions; or

Function item, function capability.

The first setting value in each list of selectable functions is a default value. The content of the read function information file shown in FIG. 9 will be described below.

A first row: The size of an original to be read can be selected from Auto, A4, A4R, B4, A3, B5, and B5R, and the default is Auto. When Auto is selected, the digital copying machine automatically detects an original size.

A second row: An original setting method can be selected from Auto, ADF, and Flat Bed, and the default is Auto. When ADF is selected, an original is fed from the auto document feeder until there is no original to be read in the auto document feeder. When Flat Bed is selected, one sheet of an original put on the glass sheet is read. When Auto is selected, an original from the ADF is read if the original is in the ADF, otherwise, an original on the glass sheet is read.

A third row: The maximum value of read resolution is 400 DPI.

A fourth row: The minimum value of read resolution is 25 DPI.

A fifth row: A gray level (the number of data bits per pixel) can be selected from 1, 2, 4, and 8 bits, and the default value is 1 bit.

A sixth row: A halftone process method can be selected from a simple binarizing process (BI), a dither process (DT), and an error diffusion process (ED). The default is the simple binarizing process (BI).

A seventh row: An image data file format can be selected from TIFF, BMP (Bitmap), and JPEG, and the default is TIFF.

An eighth row: When TIFF is selected as the image data file format, a data compressing method can be selected from G3 (MH), G4 (MMR), RLE (run length), and LZW, and the default is G3.

A ninth row: Whether a both side read function is used or not can be selected, and one side read is set as a default. (The both side read function is not used.)

A tenth row: The function of controlling contrast in reading can be selected from Auto (automatic), −2 (low contrast), −1, 0, 1, and 2 (high contrast). The default is Auto.

An eleventh row: The function of controlling read density can be selected from Auto (automatic), −2 (light), −1, 0, 1, and 2 (dark). The default is Auto.

A twelfth row: The function of controlling the degree of edge enhancement in reading can be selected from Auto (automatic), −2 (weak edge enhancement), −1, 0, 1, and 2 (strong edge enhancement). The default is Auto.

A thirteenth row: A read area can be specified. The default is setting in which a read area is not specified. (i.e., the entire area of an original size is read.)

A fourteenth row: The specified unit for a read area is a millimeter (mm).

For offline image input using the digital copying machine of the present invention, a user installs a memory card to which a read function information file is downloaded in his personal computer. Then, the user executes software for generating a scan job command file for the digital copying machine previously installed in the user's personal computer. This software refers to the read function information file stored in the memory card and displays a dialog box for allowing the user to set the read function of the digital copying machine on the display of the personal computer.

A schematic display of a dialog box corresponding to the read function information file in FIG. 9 is shown in FIG. 10. In FIG. 10, rectangular areas on the right side of "Scanning Resolution", "Scanning Area Upper-Left Position", "Scanning Area Length", and "Data File Name" are edit boxes for entering read resolution, an upper-left XY position of a read area, a length in the XY direction of the read area, and an image data file name respectively. Marks ○ are radio buttons that are alternatively selected. Marks ● indicate selected functions. Only when TIFF is selected as the image data file format is a selected function of "TIFF Compression" valid. Also, only when "Scanning Area Setting" is "Yes" are the setting values of "Scanning Area Upper-Left Position" and "Scanning Area Length" valid. Software for generating a scan job command file checks the "MAX Resolution" and "MIN Resolution" values of the read function information file, and if the values are inconsistent with the setting of "Scanning Resolution" in the dialog box, the software warns the user.

The user clicks an OK button in FIG. 10 after setting each function of the dialog box. The software for generating a scan job command file generates a scan job command file according to the setting in the dialog box and stores the file into the memory card. The content of the scan job command file corresponding to the setting of the dialog box in FIG. 10 is shown in FIG. 11. "Reset" of the scan job command file in FIG. 11 indicates to reset the set values of the read function to default values. For "Data File", the name of an image file that represents read image data is written. In FIG. 11, the image file name is "sample.tif". One image file has images of plural pages (multi-page image). Also, one scan job command file may have a plurality of jobs. Therefore, it is possible to read a plurality of original images with different read function settings.

Figure 12:
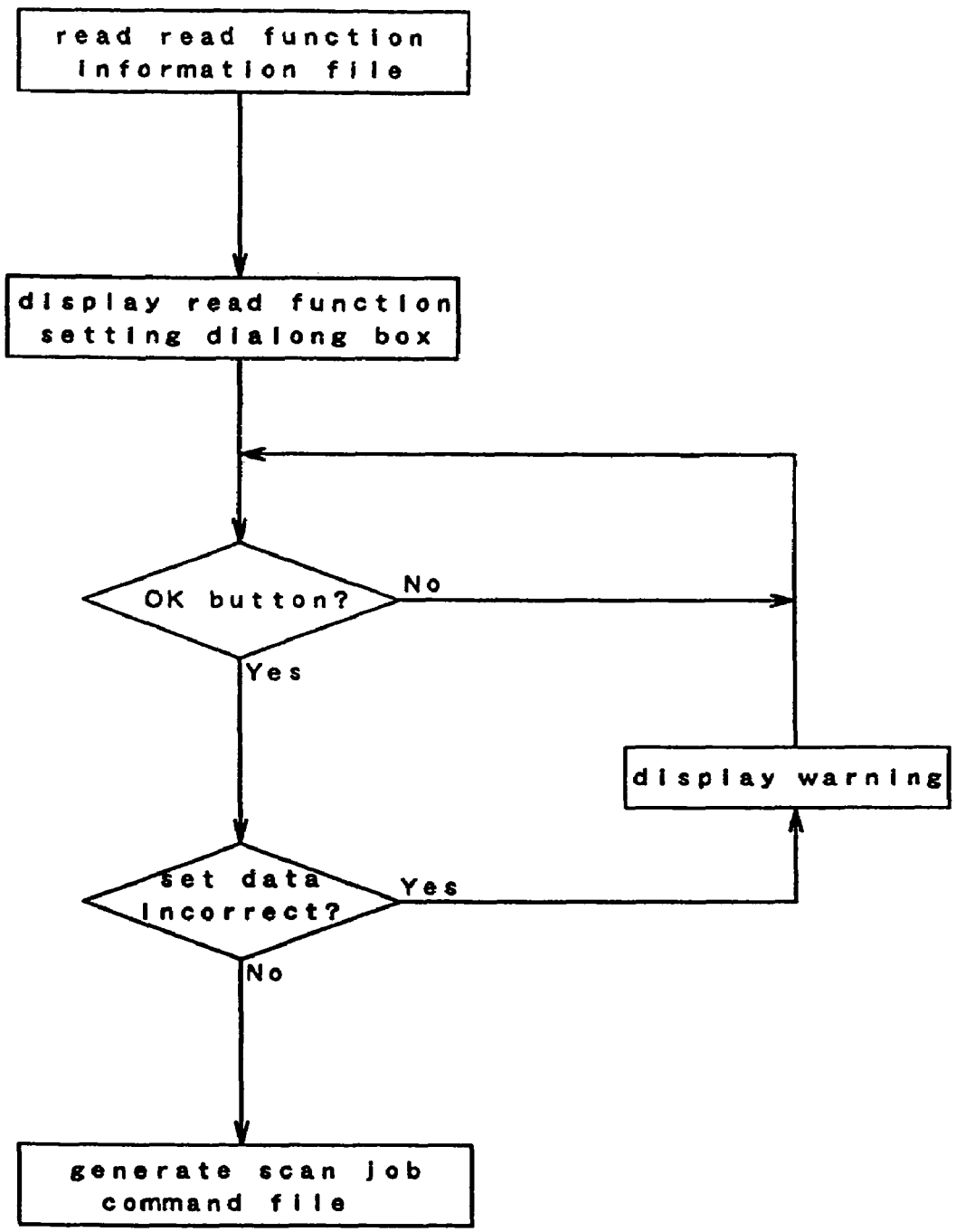
FIG. 12 is a flow chart for software that generates a scan job command file.
Figure 13:
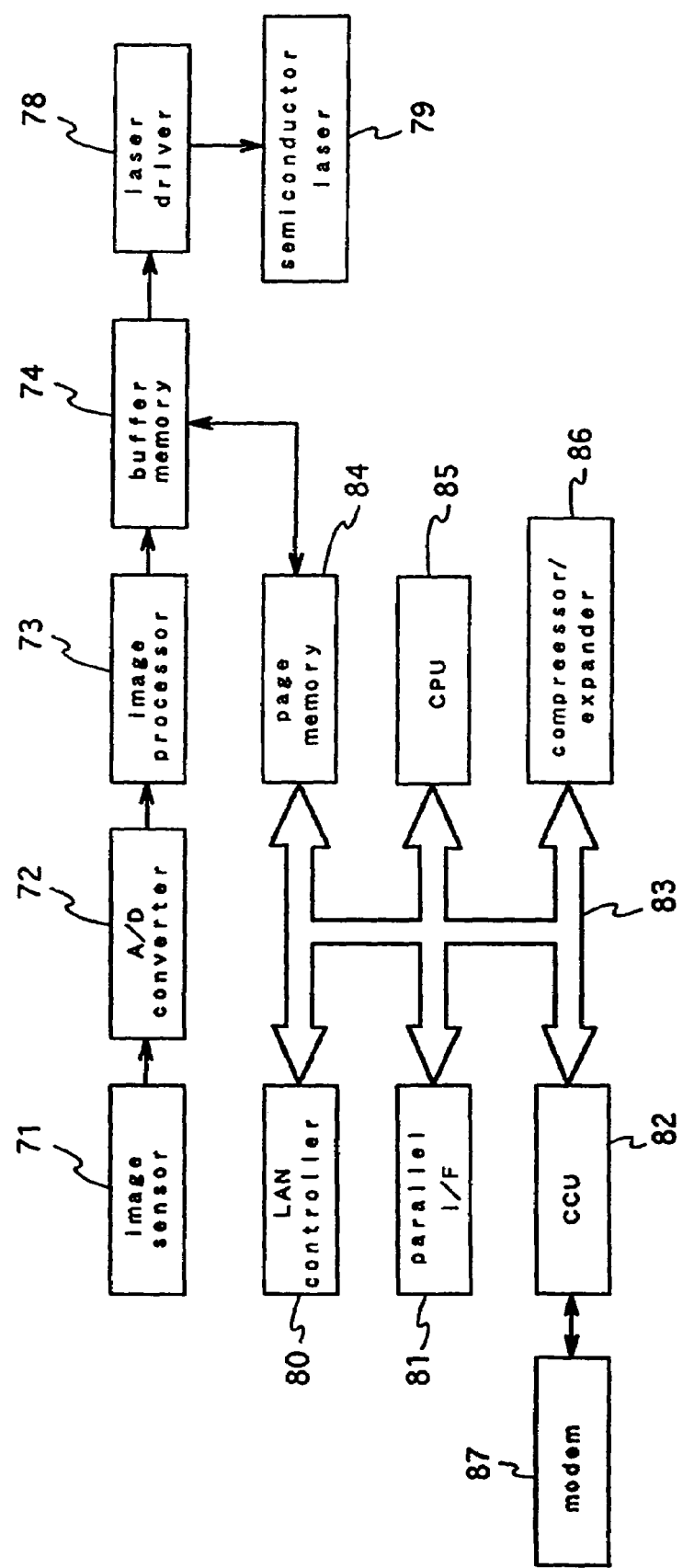
FIG. 13 is a block diagram showing a flow chart for a signal in a conventional digital copying machine.

A flow chart for the process of the software for generating a scan job command file is shown in FIG. 12. This software reads a read function information file from the memory card and displays a dialog box for setting a read function according to the file. The user clicks the OK button after setting each function of the dialog box. This software checks whether the setting of the dialog box is incorrect or not, and if the setting is incorrect, the software displays a warning to urge the user to reset the dialog box. If the setting is correct, a scan job command file is generated to be stored in the memory card.

The user pulls out the memory card storing the scan job command file from his personal computer and inserts the memory card 1 into PC card slot 89 of the digital copying machine of the present invention. CPU 85 detects through PC card controller 88 that the memory card is inserted and searches if the scan job command file exists in the memory card. If the scan job command file exists, CPU 85 analyzes the scan job command file and performs setting required for the control circuits of the image scanner part and ADF 50 part and image processor 73. Read image data is stored in page memory 84. CPU 85 controls compressor/expander 86 to compress the image data stored in the page memory and stores the compressed image data into the memory card with an image data file name specified in the scan job command file.

The user pulls out the memory card storing the image data file from the digital copying machine and installs the memory card in the user's personal computer. The user accesses the image data stored in the memory card using document generation/image edit software executed in the personal computer.

As mentioned above, when the image input function of the digital copying machine of the present invention is used, image read control data (scan job command file) is stored into the removable storage medium, and this storage medium is installed in the PC card slot of the digital copying machine. This allows the digital copying machine of the present invention to output read image data offline in a desired read form into the storage medium, and the user can readily generate read control data using a user interface of the personal computer. Even if the external equipment is not directly connected to the digital copying machine of the present invention as in the case of a portable note-type computer, an original can be readily read offline using the memory card.

Also, for a copying machine, the structure of optional equipment, such as with or without an ADF, and an ADF function (e.g., whether both side can be read or not, whether an automatic detection function for an original size is included or not), with or without a slide read device, varies, so that it is difficult to specify the image read function of the copying machine. The image read functions of copying machines of the same type differ according to the installation of optional equipment in the copying machine. However, by downloading the image read function information of the copying machine to the storage medium, a user can readily utilize usable functions even if he does not fully know the image read function of the digital copying machine.

While the memory card is used as a removable storage medium in this embodiment, similar effects can be obtained using a floppy disk, optical disk, a removable hard disk, etc. Also, while a monochrome digital copying machine is described in this embodiment, the same is true for a color copying machine. Furthermore, while the function information files and the job command files are described as character data files in this embodiment, a file encoded to binary data may be used.

Figure 14:
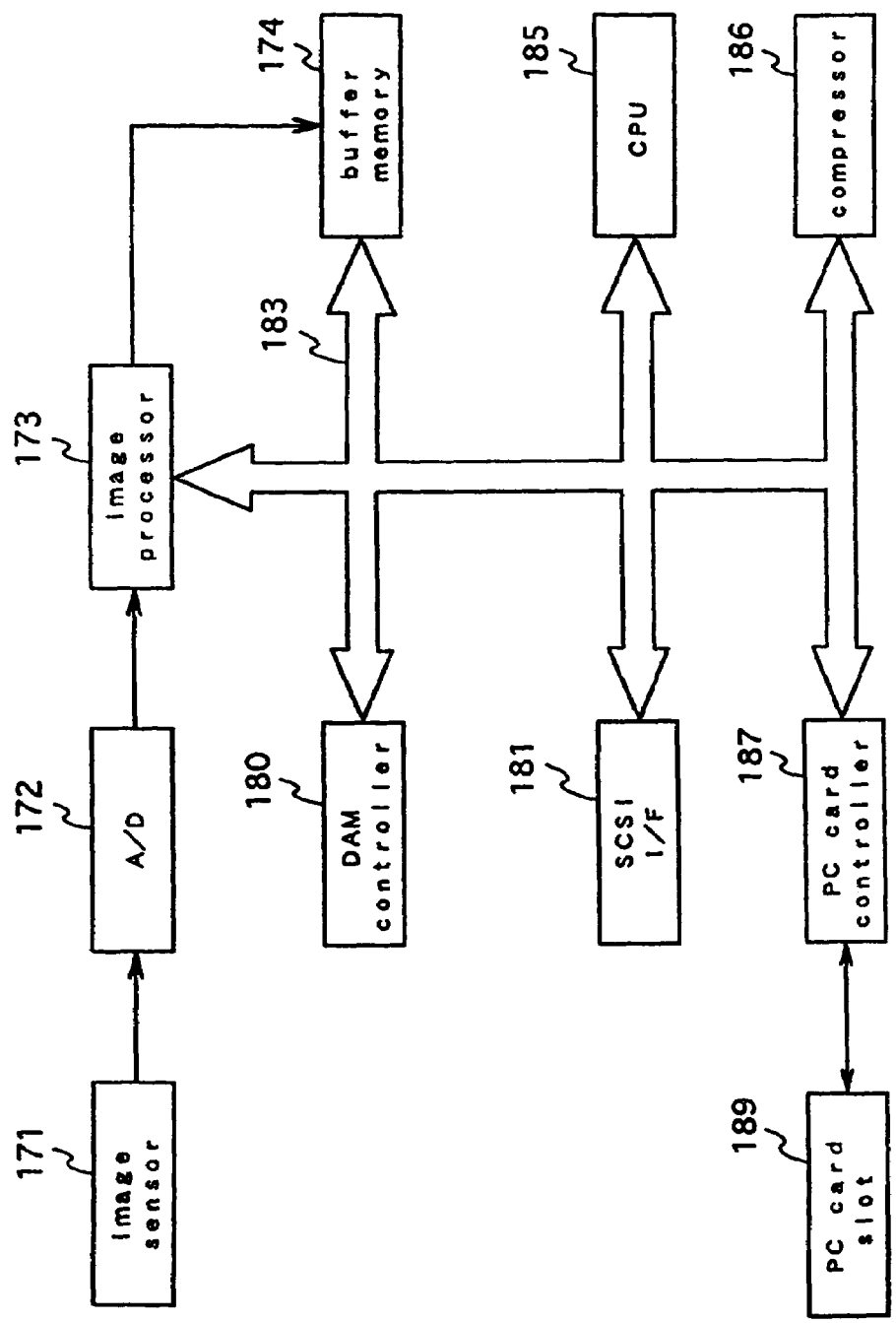
FIG. 14 is a block diagram showing a flow chart for a signal in an image reader according to an embodiment of the present invention.
Figure 21:
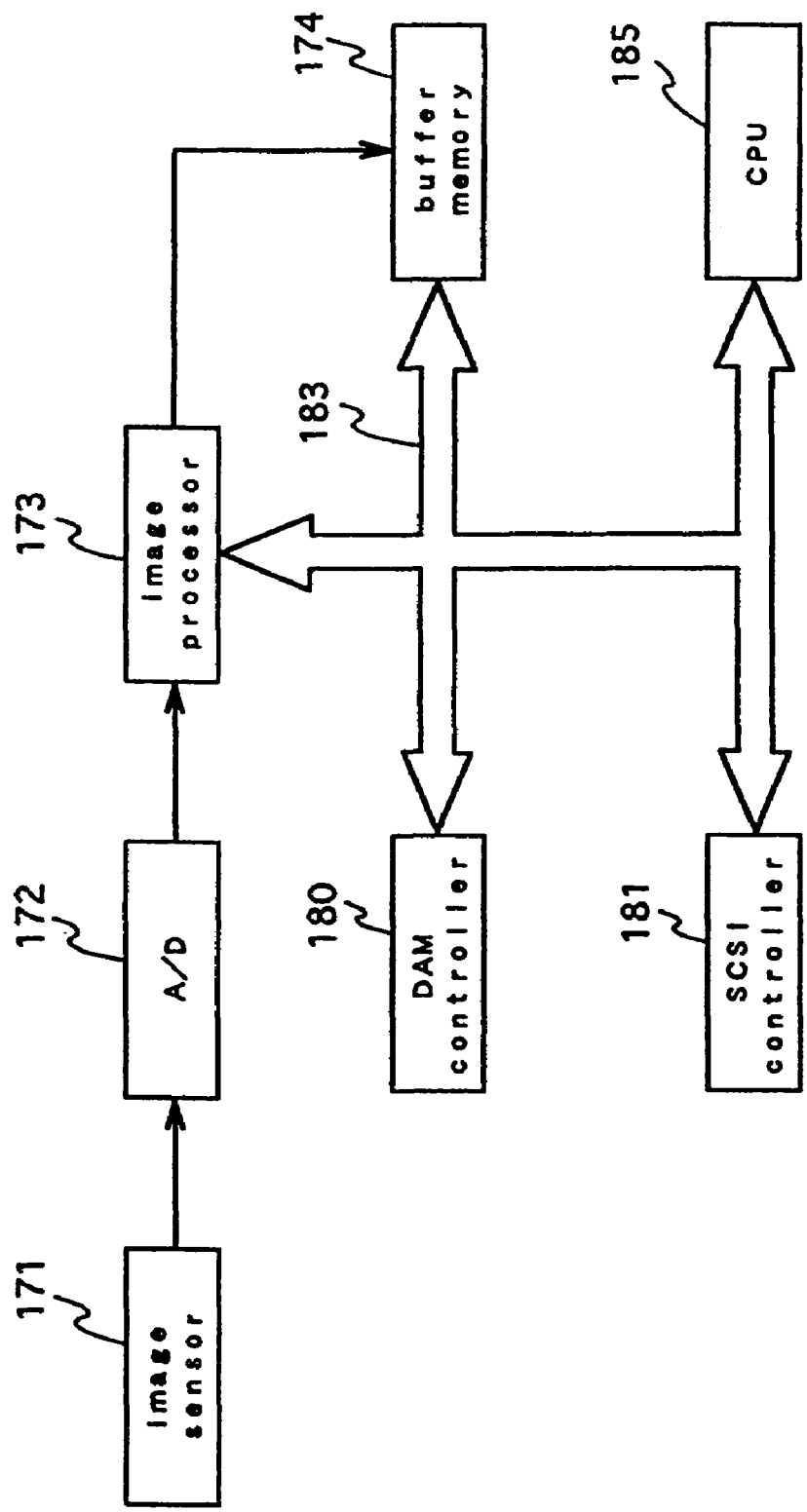
FIG. 21 is a block diagram showing a flow chart for a signal in a conventional image reader.

Next, an image reader of an embodiment of the present invention will be described by referring to the figures. FIG. 14 is a block diagram showing a flow chart for an image signal of an image reader of the present invention. In FIG. 14, like components as in FIG. 21 are given like reference numerals. The structure and operation of the image reader will be described. An image sensor 171 scans an original to convert reflected light from the original to an electric signal (analog image signal). An A/D converter 172 converts the analog image signal from the image sensor to a digital image signal. An image processor 173 performs image processing such as edge enhancement, trimming, halftone processing, gradation level conversion, and pixel density conversion, and edit processing on the digital image signal for image data output.

A buffer memory 174 stores the image data from image processor 173. A CPU 185 comprises a RAM and a ROM and controls the entire image reader. CPU 185, a PC card controller 187, a DMA controller 180, a SCSI controller 181, and an image compressor 186 are mutually connected through a CPU bus 183.

DMA controller 180 transfers the image data stored in buffer memory 174 to image compressor 186. Image compressor 186 compresses the image data transferred from DMA controller 180 to produce compressed image data. The compressed image data is DMA transferred to SCSI controller 181 by DMA controller 180. A compressing method in image compressor 186 is selected from among a plurality of compressing methods by CPU 185. An external equipment such as a computer transmits a control command for the image reader to the image reader through SCSI controller 181 and receives compressed image data from the image reader. CPU 185 sets the degree of edge enhancement, an image data gradation level, read density, etc. according to the image read control command.

Personal computer (PC) card controller 187 controls an access from CPU 185 to the memory card installed in PC card slot 189. If a scan job command file storing read control data exists in the memory card installed in PC card slot 189, the image reader reads the image of a set original according to the read control data to store compressed image data into the memory card as an image data file. Reading of an original is started when a user pushes a read start button after setting the original.

In the image reader, an image read function and an image processing function differ according to an optional equipment structure, such as with or without installation of optional equipment such as an ADF. In order to adapt to these various optional equipment structures, the image reader of this embodiment has the function of storing the image read function information of an image scanner into the memory card as an image read function information file. The detail of this offline image input function will be described later.

Figure 15:
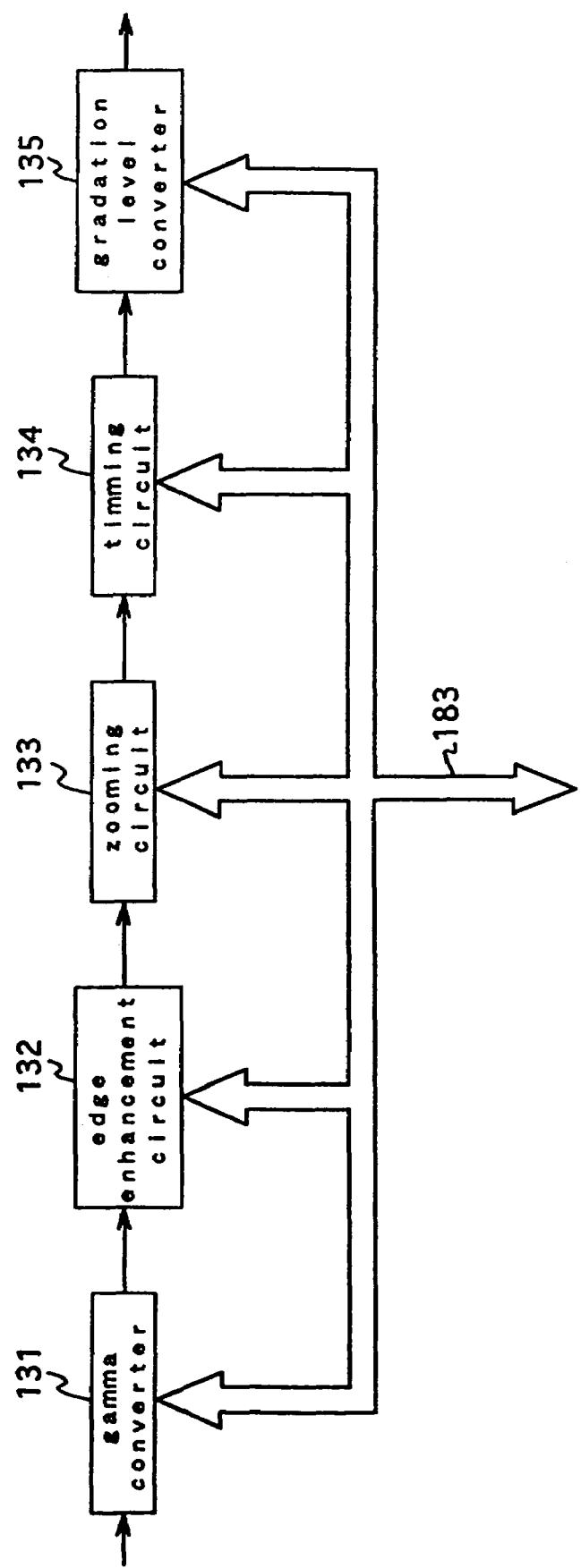
FIG. 15 is a block diagram of the image processor in FIG. 14.

FIG. 15 is a block diagram of image processor 173 in FIG. 14. A gamma converter 131, an edge enhancement circuit 132, a pixel density converter (zooming circuit) 133, a trimming circuit 134, and a gradation level converter 135 are connected to a CPU bus 183, and CPU 185 sets a process parameter for each circuit. Gamma converter 131 performs data conversion on a 8-bit digital image signal. Gamma converter 131 is a conversion table using a RAM having a capacity of 256 byte and a 8-bit address line. RAM data is downloaded from CPU 185. CPU 185 sets read density and contrast characteristics by changing the conversion table stored in the RAM.

Edge enhancement circuit 132 performs an edge enhancement process on image data using a known two-dimensional space filtering method. CPU 185 sets the degree of edge enhancement in edge enhancement circuit 132 by changing a filter factor of a space filter. Pixel density converter 133 performs pixel density conversion on image data by interpolation or thinning of the image data. CPU 185 sets the pixel density of output image data by changing the setting value of interpolation rate or thinning rate in pixel density converter 133.

Trimming circuit 134 cuts a desired rectangular area from read image data. CPU 185 sets the position and size of a cut area by changing the setting value of the cut area. Gradation level converter 135 converts image data having 8 bits per pixel (256 gradation) to N-bit image data. N is selected from 1, 4, and 8. When N is 1, any one of a simple binarizing process, a dither process, and an error diffusion process is selected as a binarizing process method. When N is 4, any one of high order N-bit extraction, a multi-value dither process, and a multi-value error diffusion process is selected as a quantizing method. When N is 8, gradation level converter 135 produces 8-bit image data unchanged. Gradation level converter 135 produces converted image data as mentioned above as a pack of 8 bit.

Figure 16:
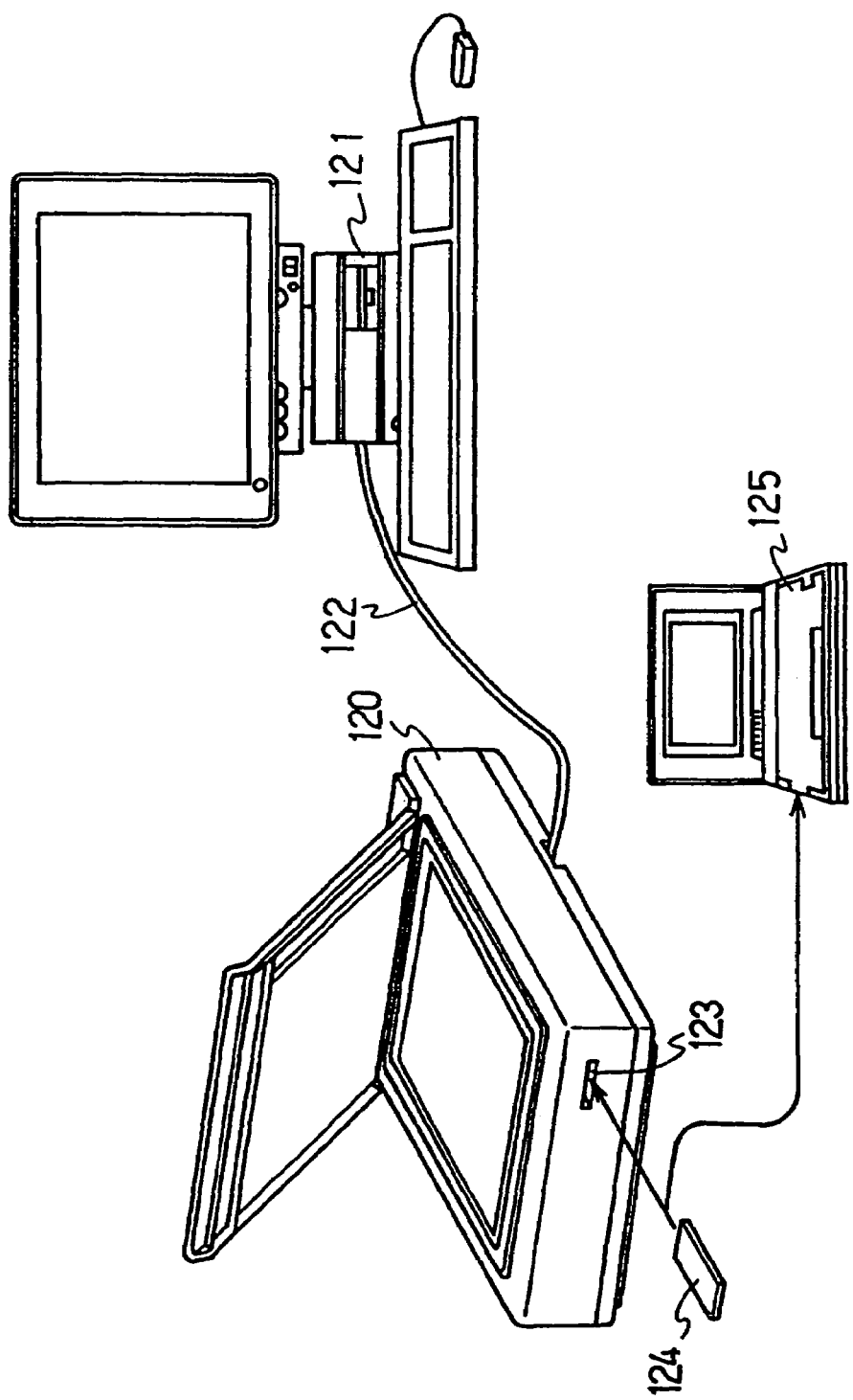
FIG. 16 shows an example of the connection between an image reader according to an embodiment of the present invention and an external equipment.

An exemplary connection between the image reader of the present invention and an external equipment is shown in FIG. 16. An image reader 120 and a personal computer 121 are connected one to one by a SCSI cable 122, and the user of personal computer 121, can directly use image reader 120 online. Also, image reader 120 comprises a PC card insertion opening where a memory card 124 is installed in and removed from. Also, memory card 124 can be installed in and removed from a note-type personal computer 125.

When the user of personal computer 125 obtains image data using image reader 120, the image data is transferred offline from image reader 120 to personal computer 125 using memory card 124.

Offline Image Input Function

An offline image input function in the image reader of this embodiment will be described. A user previously installs his memory card 124 in image reader 120 and downloads a read function information file to the memory card. The content of a read function information file is shown in FIG. 17. The content of the read function information file shown in FIG. 17 will be explained below.

The format of the read function information file is shown as follows for each row:

Function item, a list of selectable functions;

Function item, function capability; or

"if", condition for selection, "then", function item, a list of selectable functions.

The first setting value in each list of selectable functions is a default value. The content of the read function information file shown in FIG. 17 will be explained below.

A first row: The size of an original to be read can be selected from Auto, A4, A4R, B4, A3, B5, and B5R, and the default is Auto. When Auto is selected, the original size is automatically detected.

A second row: An original setting method can be selected from Auto, ADF, and Flat Bed. When ADF is selected, an original is fed from the auto document feeder continuously. When Flat Bed is selected, one sheet of an original put on the glass sheet is read. When Auto is selected, an original from the ADF is read if the original is in the ADF, otherwise, an original on the glass sheet is read. The default is Auto.

A third row: The maximum value of read resolution is 1200 DPI.

A fourth row: The minimum value of read resolution is 25 DPI.

A fifth row: A gray level (the number of data bits per pixel) can be selected from 1, 4, and 8 bits, and the default value is 1 bit.

A sixth row: When 1 is selected as the gray level, a binarizing process method can be selected from any one of a simple binarizing process (BI), a dither process (DT), and an error diffusion process (ED). The default is the simple binarizing process.

A seventh row: When 4 is selected as the gray level, a quantizing process method can be selected from any one of a high order 4-bit extraction process (SIMPLE), a multi-value dither process (DT), and a multi-value error diffusion process (ED). The default is the high order 4-bit extraction process.

An eighth row: An image data file format can be selected from TIFF, BMP, and JPEG, and the default is TIFF.

A ninth row: When TIFF is selected as the image data file format, and 1 is selected as the gray level, a data compressing method can be selected from G3 (MH), G4 (MMR), RLE (run length), and NO (no compression), and the default is G3.

A tenth row: When TIFF is selected as the image data file format, and 4 is selected as the gray level, LZW or NO can be selected as the data compressing method, and the default is LZW.

An eleventh row: When TIFF is selected as the image data file format, and 8 is selected as the gray level, LZW, JPEG, or NO can be selected as the data compressing method, and the default is LZW.

A twelfth row: When JPEG is selected as the image data file format or the compressing method, the compression rate can be selected from any one of Normal (normal compression rate), High (high compression rate), and Low (low compression rate), and the default is Normal.

A thirteenth row: The function of controlling contrast in reading can be selected from Auto (automatic), −2 (low contrast), −1, 0, 1, and 2 (high contrast). The default is Auto.

A fourteenth row: The function of controlling read density can be selected from Auto (automatic), −2 (light), −1, 0, 1, and 2 (dark). The default is Auto.

A fifteenth row: The function of controlling the degree of edge enhancement in reading can be selected from Auto (automatic), −2 (weak edge enhancement), −1, 0, 1, and 2 (strong edge enhancement). The default is Auto.

A sixteenth row: A read area can be specified. The default is setting in which a read area is not specified. (i.e., the entire area of an original size is read.) A seventeenth row: The specified unit for a read area is a millimeter (mm).

When obtaining the image data of an original using the image reader of this embodiment, a user installs memory card 124 to which a read function information file is downloaded as mentioned above in the user's personal computer 125. The user executes software for generating a scan job command file for the image reader previously installed in his personal computer 125. This software refers to the read function information file stored in memory card 124 to display a dialog box for setting a read function of image reader 120 on the display of personal computer 125.

An exemplary dialog box corresponding to the read function information file in FIG. 17 is shown in FIG. 18. In FIG. 18, box areas on the right side of "Scanning Resolution", "Scanning Area Upper-Left Position", "Scanning Area Length", and "Data File Name" are edit boxes for entering read resolution, an upper-left XY position of a read area, the length in the XY direction of the read area, and an image data file name respectively. Marks ○ are radio buttons that are alternatively selected. Marks ● indicate selected functions. In FIG. 18, TIFF is selected as an image data file format, and 1 is selected as a gray level, so that G3, G4, RLE, and NO are valid as selectable "Compression" functions. Also, in FIG. 18, JPEG is not selected as a compression method nor a file format, so that selection of "Compression Rate" is invalid. Only when "Scanning Area Setting" is "Yes", the setting values of "Scanning Area Upper-Left Position" and "Scanning Area Length" are valid.

The software for generating a scan job command file checks the values of "MAX Resolution" and "MIN Resolution" in the read function information file, and if the values are inconsistent with the setting of "Scanning Resolution" in the dialog box, the software warns the user. Similarly, when "Paper Size" (original size) is inconsistent with the setting values of "Scanning Area Upper-Left Position" and "Scanning Area Length", the software warns the user.

The user clicks an OK button in FIG. 18 after setting each function of the dialog box. The software for generating a scan job command file generates a scan job command file according to the setting in the dialog box and stores the file into memory card 124. The content of the scan job command file corresponding to the setting of the dialog box in FIG. 18 is shown in FIG. 19.

"Reset" of the scan job command file in FIG. 19 indicates to reset the set values of the read function to default values. For "Data File", the name of an image file that stores read image data is written. In FIG. 19, the image file name is "sample.tif". One image file has images of plural pages (multi-page image). Also, one scan job command file may have a plurality of jobs. Therefore, it is possible to read a plurality of originals changing read function settings.

Figure 20:
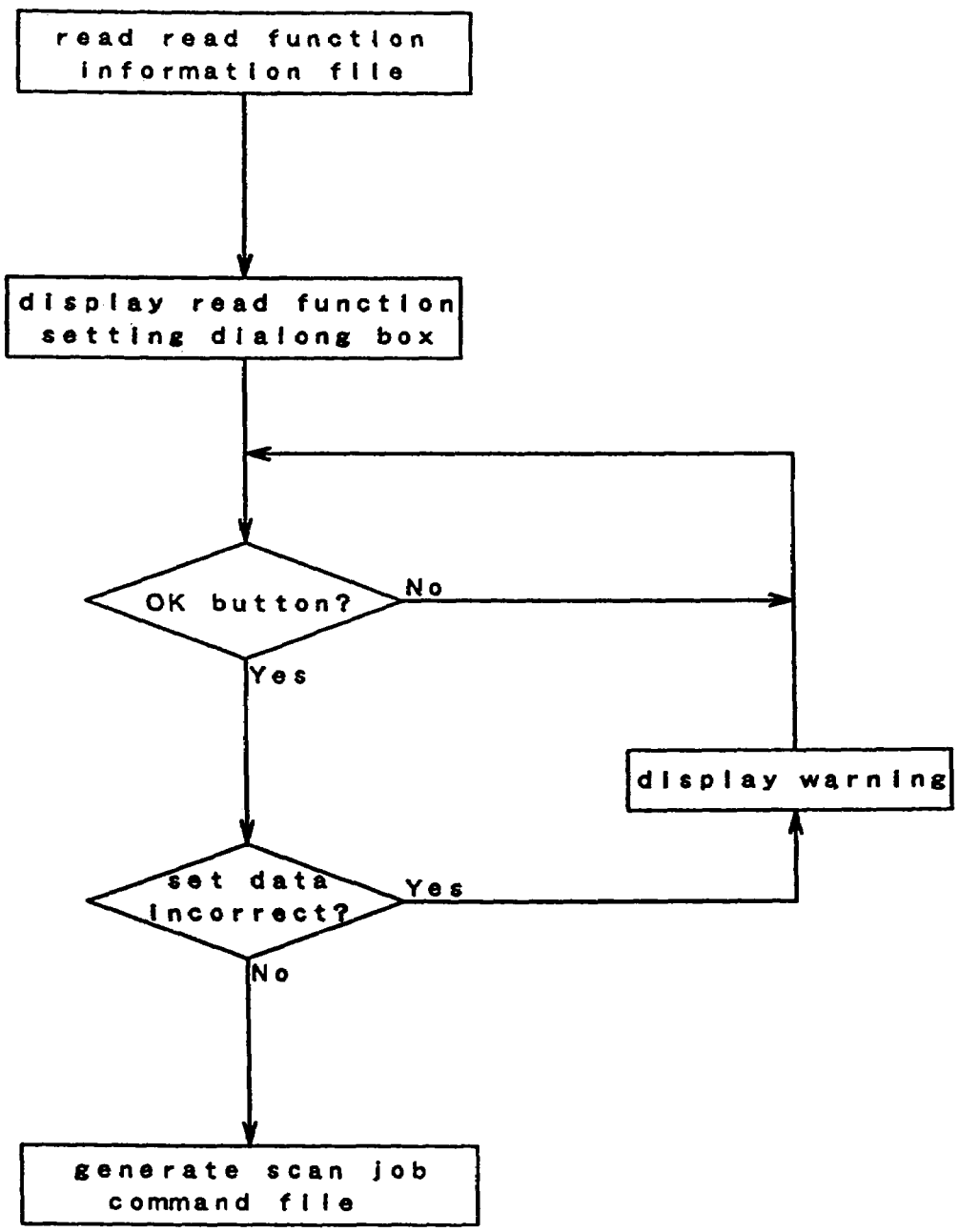
FIG. 20 is a flow chart for software that generates a scan job command file.

A flow chart of the process of the software for generating a scan job command file is shown in FIG. 20. This software reads the read function information file from memory card 124 (step S1), and displays a dialog box for setting a read function according to the file (step S2). The user clicks the OK button after setting each function of the dialog box (step S3). This software checks whether the setting of the dialog box is incorrect or not (step S4), and if the setting is incorrect, the software displays a warning (step S5) to urge the user to reset the dialog box. If the setting is correct, a scan job command file is generated (step S6) to be stored in memory card 124.

Next, the user pulls out memory card 124 storing the scan job command file from his personal computer 125 and inserts memory card 124 into PC card slot 189 of image reader 120. CPU 185 in image reader 120 detects through PC card controller 187 that memory card 124 is inserted and searches if the scan job command file exists in memory card 124. If the scan job command file exists, CPU 185 analyzes the scan job command file and performs setting required for image processor 173. Image data read by image sensor 171 are stored in memory card 124 installed in the PC card slot as an image data file through buffer memory 174, image compressor 186, and PC card controller 187.

The user pulls out memory card 124 storing the image data file from image reader 120 and again installs the memory card in his personal computer 125. The user utilizes the image data read out from memory card 124 by using document generation/image edit software executed in personal computer 125.

While the memory card is used as a removable storage medium in the image reader of this embodiment, similar effects can be obtained using a floppy disk, optical disk, a removable hard disk, etc. Also, while a monochrome image reader is described in this embodiment, the same is true for a color image reader. Furthermore, while the function information file and the job command file are character data files in this embodiment, a file encoded to binary data may be used.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A print job command file to be stored with image data in a removable memory card capable of being installed into a printer, comprising:
    designating data operable to designate at least one image data to be printed among image data stored in the memory card;
    file format data operable to indicate an image data file format of the designated image data that is separate from the designating data and is not a file extension added in the designating data; and
    setting data operable to specify conditions for printing an image according to the designated image data,
    wherein the designating data is used, in the printer into which the memory card is installed, for identifying the image data to be printed among image data stored in the memory card and reading out the image data from the memory card.

2. A file generating apparatus into which a removable memory card can be installed, having a function of generating image data so as to be stored in the memory card and a function of generating a print job command file so as to be stored in the memory card, the print job command file storing output control data for printing an image according to the image data stored in the memory card,
    wherein the print job command file comprising:
        designating data operable to designate at least one image data to be printed among image data stored in the memory card;
        file format data operable to indicate an image data file format of the designated image data that is separate from the designating data and is not a file extension added in the designating data; and
        setting data operable to specify conditions for printing an image according to the designated image data,
        wherein the designating data is used, in the printer into which the memory card is installed, for identifying the image data to be printed among image data stored in the memory card and reading out the image data from the memory card.

3. A printer into which a removable memory card storing image data and a print job command file can be installed, comprising:
    a card slot operable to install the memory card;
    a decompressor operable to expand the image data stored in the memory card; and
    a controller operable to perform control of printing the image data stored in the memory card according to the print job command file stored in the memory card;
    wherein the print job command file comprising:
    designating data operable to designate at least one image data to be printed among image data stored in the memory card;
    file format data operable to indicate an image data file format of the designated image data that is separate from the designating data and is not a file extension added in the designating data; and
    setting data operable to specify conditions for printing an image according to the designated image data, and
    the controller reads out the print job command file stored in the memory card, analyzes the file, and according to the result of the analysis, controls functions of:
    reading out the image data designated by the print job command file among the image data stored in the memory card;
    expanding the read out image data by the decompressor, if necessary; and
    printing an image according to the read out image data or the expanded image data.

4. A method of generating a print job command file to be stored in a removable memory card with image data, comprising:
    generating the print job command file so as to include designating data operable to designate at least one image data to be printed among image data stored in the memory card, file format data operable to indicate an image data file format of the designated image data that is separate from the designating data and is not a file extension added in the designating data, and setting data operable to specify conditions for printing an image according to the designated image data; and
    storing the generated print job command file in the memory card,
    wherein the designating data is used, in the printer into which the memory card is installed, for identifying the image data to be printed among image data stored in the memory card and reading out the image data from the memory card.

5. A method of printing an image according to image data stored in a removable memory card with a print job command file, the print job command file including designating data operable to designate at least one image data to be printed among image data stored in the memory card, file format data operable to indicate an image data file format of the designated image data that is separate from the designating data and is not a file extension added in the designating data, and setting data operable to specify conditions for printing an image according to the designated image data,
the method comprising:
reading out the print job command file stored in the memory card and analyzing the file;
according to the result of the analysis, reading out the image data designated by the print job command file among the image data stored in the memory card;
according to the result of the analysis, expanding the read out image data by the decompressor, if necessary; and
according to the result of the analysis, printing an image according to the read out image data or the expanded image data.

6. A print job command file to be stored with image data in a removable memory card capable of being installed into a printer, comprising:
designating data operable to designate at least one image data to be printed among image data stored in the memory card;
file format data operable to indicate an image data file format of the designated image data that is separate from the designating data and is not a file extension added in the designating data; and
setting data operable to specify conditions for printing an image according to the designated image data,
wherein the designating data is used, in the printer into which the memory card is installed, for identifying the image data to be printed among image data stored in the memory card and reading out the image data from the memory card, and
the file format data provides information capable of being obtained by analyzing the image data or a file in which the image data is included.

* * * * *